United States Patent
Hacker (10) Patent No.: US 8,024,108 B2
(45) Date of Patent: Sep. 20, 2011

(54) METHOD FOR MONITORING THE SECONDARY AIR SYSTEM IN AN EXHAUST-GAS PURIFICATION SYSTEM

(75) Inventor: Frank Hacker, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 598 days.

(21) Appl. No.: 12/161,488

(22) PCT Filed: Nov. 9, 2006

(86) PCT No.: PCT/EP2006/068262
§ 371 (c)(1),
(2), (4) Date: Jul. 18, 2008

(87) PCT Pub. No.: WO2007/087905
PCT Pub. Date: Aug. 9, 2007

(65) Prior Publication Data
US 2010/0222981 A1    Sep. 2, 2010

(30) Foreign Application Priority Data
Jan. 20, 2006 (DE) .......................... 10 2006 002 894

(51) Int. Cl.
*F01N 3/22* (2006.01)
*F02B 75/22* (2006.01)

(52) U.S. Cl. ................. 701/114; 60/277; 73/114.71
(58) Field of Classification Search .............. 701/102, 701/114; 60/277; 73/114.69, 114.71
See application file for complete search history.

(56) References Cited

U.S. PATENT DOCUMENTS

| | | | | |
|---|---|---|---|---|
| 3,916,622 A | * | 11/1975 | Gospodar | 60/277 |
| 3,955,363 A | * | 5/1976 | Manderscheid | 60/277 |
| 5,279,114 A | * | 1/1994 | Kurita et al. | 60/276 |
| 5,542,292 A | | 8/1996 | Schneider et al. | 73/118.1 |
| 5,870,891 A | | 2/1999 | Dambach | 60/274 |
| 6,131,447 A | * | 10/2000 | Oeller | 73/114.32 |
| 6,973,777 B2 | | 12/2005 | Bayerle et al. | 60/289 |
| 7,140,177 B2 | | 11/2006 | Koyama et al. | 60/289 |
| 7,562,565 B2 | * | 7/2009 | Heinrich et al. | 73/114.69 |
| 2004/0255575 A1 | | 12/2004 | Tachibana et al. | 60/277 |
| 2005/0150209 A1 | * | 7/2005 | Kesch et al. | 60/277 |

FOREIGN PATENT DOCUMENTS

| DE | 41 20 891 A1 | 1/1993 |
|---|---|---|
| DE | 43 43 639 A1 | 6/1995 |
| DE | 196 09 922 A1 | 9/1997 |
| DE | 100 65 963 A1 | 7/2002 |
| DE | 102 49 421 A1 | 5/2004 |
| DE | 10 2004 058 398 A1 | 7/2005 |
| DE | 197 13 180 C1 | 9/2008 |
| EP | 0 928 366 B1 | 3/2002 |

\* cited by examiner

*Primary Examiner* — Stephen K Cronin
*Assistant Examiner* — Arnold Castro
(74) *Attorney, Agent, or Firm* — King & Spalding L.L.P.

(57) ABSTRACT

The individual cylinders of the internal combustion engine are divided into at least two cylinder banks wherein each is assigned a separate exhaust-gas channel. Secondary air is conveyed by a compressor. The flow of the secondary-air mass flow is set independently by an electrically controllable throughflow control. A value for the entire secondary-air mass flow is determined from the signal of a secondary-air mass sensor. The throughflow control is controlled into an open position, the value for the entire secondary-air mass flow is detected and subsequently the throughflow control is controlled into a closed position, the values for the secondary-air mass flows are detected before and after closure, and these values are compared with a plurality of different threshold values and, as a function of the result of the comparisons, a determination is made of the fault location with regard to the respective cylinder bank.

18 Claims, 4 Drawing Sheets

METHOD FOR MONITORING THE SECONDARY AIR SYSTEM IN AN EXHAUST-GAS PURIFICATION SYSTEM

CROSS-REFERENCE TO RELATED APPLICATIONS

This application is a U.S. national stage application of International Application No. PCT/EP2006/068262 filed Nov. 9, 2006, which designates the United States of America, and claims priority to German application number 10 2006 002 894.5 filed Jan. 20, 2006, the contents of which are hereby incorporated by reference in their entirety.

TECHNICAL FIELD

The invention relates to a method for monitoring the secondary air system in an exhaust gas purification system of an internal combustion engine having a plurality of cylinder banks.

BACKGROUND

Three-way exhaust gas catalytic converters (hereinafter referred to as catalytic converters for simplicity) have proved their worth for a long time now as a means of reducing exhaust emissions in an internal combustion engine. In an internal combustion engine at normal operating temperature, up to 98% of the hydrocarbon, carbon monoxide and nitrogen oxide emissions can be converted by means of commercially available systems.

The emission behavior is unsatisfactory during cold starting and the immediately following warming-up phase of spark-ignited internal combustion engines, since at these times the catalytic converter and the lambda probe have not yet reached their operating temperatures.

A possible measure for improving the exhaust gas quality consists in introducing fresh air (referred to as secondary air) into the exhaust manifold close to the exhaust valves so that the exhaust gas constituents that were not combusted during starting due to a rich mixture are oxidized by afterburning at temperatures of up to 600° C. This exothermic reaction leads to an increase in the exhaust gas temperature and hence to a shortening of the warm-up or light-up time of the catalytic converter. The unburnt exhaust gas constituents are reduced at the same time.

A so-called secondary air pump is employed to introduce the secondary air. Said secondary air pump is an electrically driven compressor which draws in air from the environment and injects it into the exhaust gas tract close to the exhaust valves via secondary air lines into which a shutoff valve, which as a general rule is of the pneumatic type, is inserted.

The secondary air charger constitutes a powerful alternative to the electrically driven secondary air pump. Said secondary air charger consists of a turbine and a compressor, the turbine being driven by the pressure difference at the throttle valve in the intake tract. The compressor is disposed in a secondary air bypass to the throttle valve and delivers fresh air into the exhaust gas tract.

In internal combustion engines having a plurality of cylinders, e.g. 6, 8, or 12 cylinders, the cylinders are assigned to what are termed cylinder banks. In an 8-cylinder internal combustion engine, for example, the cylinders 1-4 are assigned to a first cylinder bank and the cylinders 5-8 to a second cylinder bank. In this arrangement each cylinder bank can be supplied with air by means of its own secondary air pump having associated secondary air lines or a single secondary air pump supplies both cylinder banks, in which case a line connected to the pump outlet then branches off and a secondary air line leads to each of the individual cylinder banks. This results in a bank-selective secondary air injection.

Since the secondary air system constitutes an exhaust-gas-relevant component within the motorized vehicle driven by means of the internal combustion engine, it must be checked for any faults that may occur. Future legislative measures (ARB, Air Resources Board, LEV II) provide that not only must the secondary air system as such, i.e. globally, be checked with regard to proper operation, but that in a system comprising a plurality of cylinder banks and consequently a plurality of secondary air paths, each individual subsystem must also be diagnosed and a bank-selective differentiation made in the event of a fault.

DE 41 20 891 A1 describes an internal combustion engine having a secondary air pump in which the delivery performance of the secondary air pump is monitored. Toward that end, the actual performance is compared with the desired performance at defined operating points.

DE 43 43 639 A1 discloses a method for monitoring a secondary air system wherein a first value is calculated which characterizes the secondary air stream blown into the exhaust gas channel of the internal combustion engine by the secondary air system. The first value is calculated from the air stream supplied to the internal combustion engine, from the air/fuel ratio of the mixture drawn in by the internal combustion engine and from the air/fuel ratio prevailing in the exhaust gas channel downstream of the secondary air line. The first value is compared with a predefined interval and in the event of a deviation a malfunction of the secondary air system is detected.

DE 197 13 180 C1 discloses a method for monitoring the secondary air mass flow of an exhaust gas purification system for an internal combustion engine. Secondary air is fed by means of a secondary air pump to an exhaust gas duct of the internal combustion engine upstream of an exhaust gas catalyzer, the measured signal of a secondary air mass meter being recorded. The variation in time of the measured signal is determined and a malfunction of the secondary air supply is detected if the variation does not correspond to a predetermined variation.

EP 0 928 366 B1 discloses a secondary air system for an internal combustion engine which has a secondary air pipe which is connected to an intake tract via an inlet orifice and to an exhaust gas tract via an outlet orifice. The inlet orifice is located downstream of an air mass meter measuring the air mass flowing into the cylinders of the internal combustion engine and upstream of a throttle valve. The secondary air system comprises a secondary air valve which is installed in the secondary air pipe and a control device with a monitoring unit which controls the degree of opening of the secondary air valve. The monitoring unit, which includes a physical model of the intake tract and the secondary air system, determines an estimated value of a secondary air mass flow as a function of the aperture angle of the throttle valve, the revolutions per minute, and a measured value of a first air mass flow determined by the air mass meter.

DE 196 09 922 A1 discloses a method for monitoring the secondary air injection in the case of an internal combustion engine having a measuring sensor for measuring the oxygen content in the exhaust gas. The method is based on the reaction of the measuring sensor to the switching-in of the secondary air, the volume of the air aspirated by the internal combustion engine being increased during the supply of air to the exhaust gas.

DE 102 49 421 A1 discloses a method for monitoring the delivery of secondary air to the exhaust gas of an internal combustion engine, wherein the internal combustion engine has at least two partially separate exhaust gas systems in each which are disposed an exhaust gas catalyzer and, upstream thereof, a lambda probe. A secondary air pump is provided which delivers the drawn-in secondary air initially via a single secondary air line containing an electrically controllable secondary air valve and which branches off downstream of the secondary air valve into a number of individual secondary air lines corresponding to the number of exhaust gas systems for the purpose of delivering secondary air to the respective exhaust gas systems. A value for the total air mass flow that is introduced into the exhaust gas systems is determined from the signal of at least one air mass meter. In order to determine the actual air mass introduced into the individual exhaust gas systems, the output signals from the lambda probes in the exhaust gas systems are referred to in order to identify an uneven distribution of the air mass supplied to the individual exhaust gas systems.

DE 100 65 963 A1 discloses an apparatus for supplying secondary air on an individual cylinder basis to the exhaust gas of an internal combustion engine, said apparatus having at least two partially separated exhaust gas pipes and a secondary air pump having secondary air conduits which connect the outlet side of the secondary air pump to one of the aforesaid separate exhaust gas pipes in each case. A separately controllable flow control means is provided in each of the said secondary air conduits. Additionally provided on the outlet side of the secondary air conduit is at least one further controllable opening whose opening state influences the pressure in the said secondary air conduits. A diagnosis of the individual secondary air conduits is not addressed.

SUMMARY

A method and a device for monitoring the secondary air system in an exhaust gas purification system of an internal combustion engine having a plurality of cylinder banks may be provided, which method or device permits faults to be identified selectively on an individual cylinder bank basis.

According to an embodiment, a method for monitoring the secondary air system of a multi-cylinder internal combustion engine by means of which secondary air is introduced into the exhaust gas of the internal combustion engine, may comprise the steps of: —subdividing the individual cylinders of the internal combustion engine into at least two cylinder banks and assigning each cylinder bank a separate exhaust gas duct, —conveying secondary air with the aid of a compressing means and introducing the secondary air into the respective exhaust gas ducts by way of a number of individual secondary air lines corresponding to the number of exhaust gas ducts, —adjusting the flow rate of the secondary air mass flow with the aid of electrically controllable flow control means in each of the individual secondary air lines independently of each other for the purpose of introducing secondary air mass flows on an individual cylinder bank basis, —determining a value for the total secondary air mass flow that is introduced into the exhaust gas ducts from the signal of a secondary air mass meter, —actuating the flow control means into an open position, —recording the value for the total secondary air mass flow, —actuating the flow control means into a closed position individually at time intervals relative to one another, —recording the values for the secondary air mass flows occurring thereby before and after the closing of the individual flow control means, —comparing said values with a plurality of different threshold values, and —making a differentiation of the fault location with regard to the respective cylinder bank as a function of the result of the comparisons.

According to another embodiment, in a device for monitoring the secondary air system of a multi-cylinder internal combustion engine by means of which secondary air is introduced into the exhaust gas of the internal combustion engine, the internal combustion engine may have at least two cylinder banks, to each of which a specific number of cylinders of the internal combustion engine are assigned and each individual cylinder bank has a separate exhaust gas duct, a compressing means may be provided that conveys secondary air and introduces the secondary air into the respective exhaust gas ducts by way of a number of individual secondary air lines corresponding to the number of exhaust gas ducts, and the device may comprise: in each case a flow control means controllable independently of each other by means of signals of a control device in each of the individual secondary air lines for the purpose of introducing secondary air mass flows on an individual cylinder bank basis, and an air mass meter from the signal of which a value is determined for the total secondary air mass flow that is introduced into the exhaust gas ducts, wherein the control device is operable—to actuate the flow control means into an open position, —to record the value for the total secondary air mass flow, —to then actuate the flow control means into a closed position individually at time intervals relative to one another, —to record the values for the secondary air mass flows occurring thereby before and after the closing of the individual flow control means, —to compare said values with a plurality of different threshold values, and —to differentiate the fault location with regard to the respective cylinder bank as a function of the result of the comparison.

According to a further embodiment, at a first step a first of the flow control means may be closed, the difference between the values for the secondary air mass flow before and after the closing of the first flow control means may be formed and compared with a first threshold value, if the first threshold value is exceeded, it may be concluded that a flow control means in the secondary air line of the first cylinder bank is sticking in the open state or that there is a leak in the secondary air line of the first cylinder bank, a check may be carried out to determine whether the value of the secondary air mass flow is equal to zero and in the case of a positive result it is concluded that a flow control means in the secondary air line of the further cylinder bank is sticking in the closed state, otherwise the secondary air system of the first cylinder bank is classified as operating correctly. According to a further embodiment, the method may further comprise the steps: —closing of a further flow control means, —forming of the difference between the values for the secondary air mass flow before and after the closing of the further flow control means and comparison with a second threshold value, —if the second threshold value is exceeded, it is determined that a flow control means in the secondary air line of the second cylinder bank is sticking in the open state or that there is a leak in the secondary air line of the second cylinder bank, —otherwise the secondary air system of the second cylinder bank is classified as operating correctly. According to a further embodiment, if malfunctions of the secondary air system are detected a corresponding entry can be written into an error memory of the control device and/or the occurrence of the malfunction can be communicated to the driver of the vehicle being driven by means of the internal combustion engine. According to a further embodiment, an electrically driven secondary air pump may be used as the compressing means. According to a further embodiment, a secondary air charger can be used as the compressing means, a turbine of said secondary air charger being driven by the pressure difference at a throttle valve in the intake duct of the internal combustion engine and a compressor being disposed in a secondary air bypass to the throttle valve. According to a further embodiment, electrically controllable secondary air valves may be used as flow control means. According to a further embodiment, electrical-pneumatic secondary air valves may be used as flow control means. According to a further embodiment, the threshold values may be determined and specified experimentally, the second threshold value SW2 being greater than the first threshold value SW1.

BRIEF DESCRIPTION OF THE DRAWINGS

The invention is explained in more detail with reference to the figures, in which.

DETAILED DESCRIPTION

According to various embodiments, in a method and a corresponding device for monitoring the secondary air system of a multi-cylinder internal combustion engine, the individual cylinders of the internal combustion engine are subdivided into at least two cylinder banks and each cylinder bank is assigned a separate exhaust gas duct. Secondary air is conveyed with the aid of a compressing means and introduced into the respective exhaust gas ducts via a number of individual secondary air lines corresponding to the number of exhaust gas ducts. The flow rate of the secondary air mass flow is set in each of the individual secondary air lines independently of one another with the aid of electrically controllable flow control means. A value for the total secondary air mass flow that is introduced into the exhaust gas ducts is determined from the signal of a secondary air mass meter. The flow control means are actuated into an open position, the value for the total secondary air mass flow is measured and then the flow control means are individually actuated into a closed position at time intervals relative to one another, the values for the secondary air mass flows occurring thereby before and after the closing of the individual flow control means are recorded and said values are compared with a plurality of different threshold values and a differentiation of the fault location with regard to the respective cylinder bank is made as a function of the result of the comparison.

By time-sequential closing of the individual flow control means and observation of the secondary air mass flow that establishes itself it can easily be determined whether a possible fault is present and, if a fault is present, in which subsystem of the secondary air system the fault lies, i.e. which cylinder bank is affected thereby.

Figure 1:
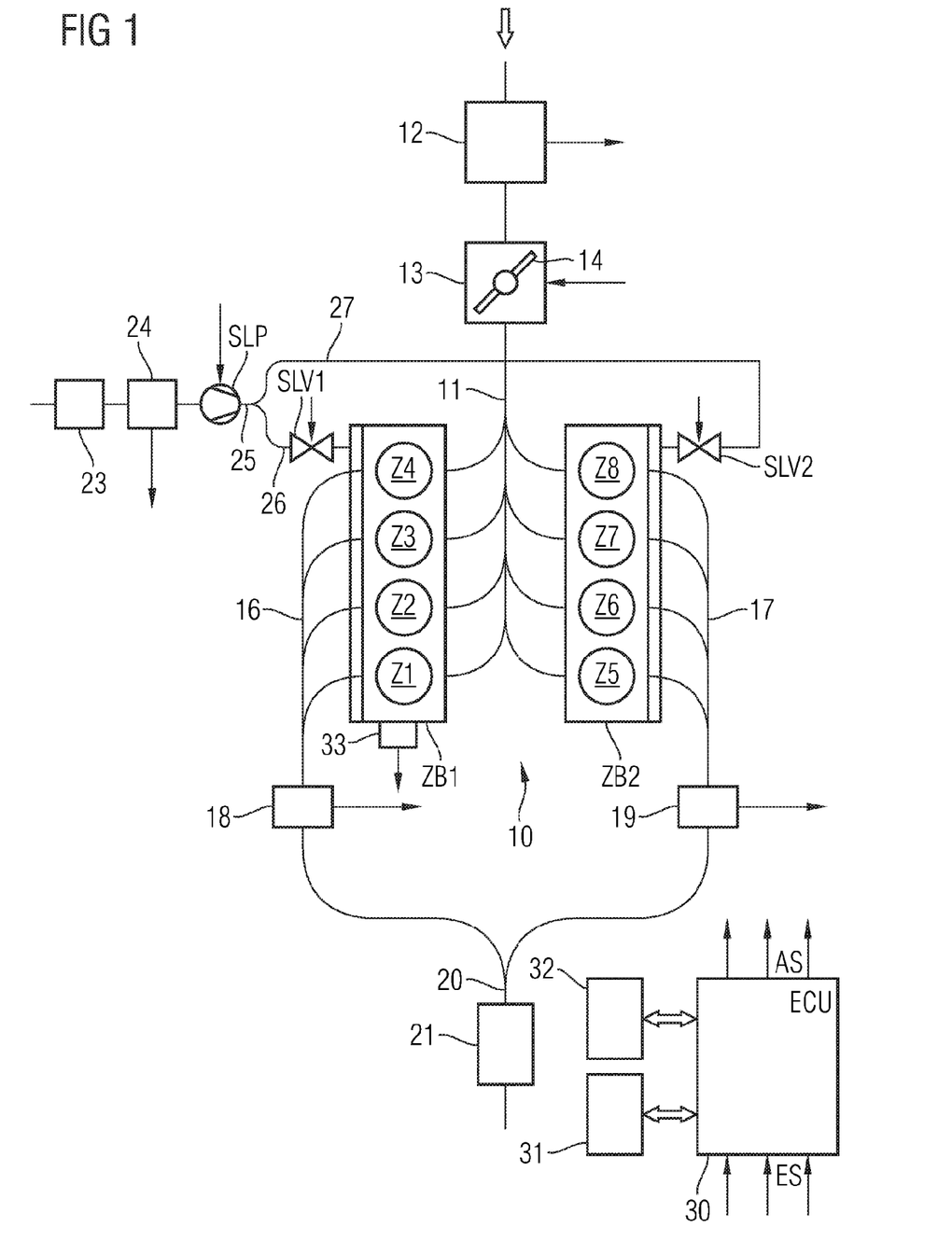
FIG. 1 shows an internal combustion engine having an exhaust gas purification system and a secondary air system.

FIG. 1 shows in the form of a block diagram an internal combustion engine 10, with only those components explicitly shown that are necessary for understanding the invention. In particular, the fuel supply together with the associated injection valves and the ignition device has been omitted. The internal combustion engine has eight cylinders Z1-Z8, the cylinders Z1-Z4 being assigned to a first cylinder bank ZB1 and the cylinders Z5-Z8 to a second cylinder bank ZB2.

The various embodiments are explained with reference to an internal combustion engine having what is known as a V engine with eight cylinders, wherein the cylinders are aligned in two planes which form an angle with each other and whose line of intersection goes through the crankshaft axis or lies parallel thereto. It can, however, also be applied to any other internal combustion engine that has a plurality of cylinders and at least two cylinder banks, the engine design (inline engine, V engine, W engine, boxer engine, etc.) being irrelevant provided a separate secondary air line with associated secondary air valves is provided for each cylinder bank.

Fresh air is supplied to the internal combustion engine 10 via an intake duct 11. Provided in the intake duct 11, viewed in the direction of flow of the drawn-in air, are an air mass meter 12 and a throttle valve block 13 comprising a throttle valve 14 and a throttle valve sensor (not shown) for measuring the aperture angle of the throttle valve 14.

The cylinder bank ZB1 is assigned an exhaust gas duct 16 having an exhaust gas sensor 18, and the cylinder bank ZB2 is assigned an exhaust gas duct 17 having an exhaust gas sensor 19. The exhaust gas sensors 18, 19 are advantageously embodied as lambda probes. In this case use can be made of either what are referred to as binary lambda probes, which in the event of an air ratio of lambda=1 have a jump characteristic in respect of their output signal, or what are termed linear lambda probes, which show an essentially linear characteristic in their output signal. The two exhaust gas ducts 16, 17 converge at a point downstream of the exhaust gas sensors 18, 19 into a common exhaust gas duct 20, in the further course of which a three-way catalytic converter 21 serving to convert harmful exhaust gas constituents is inserted. Further exhaust gas aftertreatment components such as e.g. NOx adsorber catalytic converters (NOx trap) can also be connected downstream of said exhaust gas catalytic converter.

A bank-selective secondary air system is provided for fast light-up of said catalytic converter 21 during a cold start and subsequent warming-up phase of the internal combustion engine. An electrically driven secondary air pump SLP draws in fresh air via an air filter 23 and a secondary air mass meter 24. A common secondary air line 25 leads from the output of the secondary air pump SLP in the direction of the individual exhaust gas ducts and then branches off in physical proximity to the cylinder banks ZB1, ZB2 into two cylinder-bank-selective partial secondary air lines 26, 27. An electrically controllable secondary air valve SLV1 is inserted into the partial secondary air line 26, and an electrically controllable secondary air valve SLV2 is inserted into the partial secondary air line 27. Both secondary air valves SLV1, SLV2 can be controlled independently of each other. The partial secondary air lines 26, 27 are preferably connected to the engine block directly after the exhaust valves at the exhaust gas ducts. The secondary air valves SLV1, SLV2 are preferably also positioned directly on the engine block (in FIG. 1 they are shown in the partial secondary air lines 26, 27 at a distance from the engine block simply for reasons of clarity).

Other compressing means which convey fresh air in the direction of the exhaust gas system can also be provided for the purpose of delivering the secondary air instead of the secondary air pump; in particular a secondary air charger having the design cited in the introduction can be used.

Furthermore it is possible to use as the secondary air pump a pump which operates only in on/off mode or a pump having an adjustable delivery rate. It is also possible to combine the secondary air mass meter and the secondary air pump into a single component, thereby creating a particularly compact, space-saving unit.

Secondary air valves are cited in this context as flow control means for adjusting the secondary air mass flow to the individual exhaust gas ducts. Secondary air valves that are controllable electrically-pneumatically can also be used instead of electrically controllable secondary air valves. All that is necessary is that the secondary air valves can be actively switched on and off independently of the pressure delivered by the secondary air pump or secondary air charger.

A control device (ECU, electronic control unit) 30 is provided which is connected via data and control lines to the internal combustion engine 10, the secondary air pump SLP, the secondary air valves SLV1, SLV2, the secondary air mass meter 24 and the air mass meter 12 in the intake duct. The signals of the two exhaust gas sensors 18, 19, as well as further input signals ES, in particular the signal of a temperature sensor 33 which is positioned at a suitable point on the engine block and emits a signal corresponding to the temperature of the coolant of the internal combustion engine, are supplied to the control device 30. Further output signals AS for actuators that are required for the operation of the internal combustion engine 10 are drawn only schematically in the figure. The control device 30 is also connected to a data memory 31 and to an error memory 32 via data lines that are not identified more precisely.

The control device 30 controls inter alia the injection of fuel into the internal combustion engine 10 as a function of the measured exhaust gas values (exhaust gas sensors 18, 19) and the aspirated air mass (air mass meter 12), the driver's input, measured e.g. by way of an accelerator pedal sensor, being taken into account. In addition, based on the aspirated air mass and based on the air/fuel ratio in the exhaust gas ducts 16, 17, the control device 30 switches the secondary air pump SLP as a function of data stored in the data memory 31 in such a way that the catalytic converter 21 is heated up in an optimal manner.

For checking purposes the control device 30 determines via the secondary air mass meter 24 the secondary air mass flow actually delivered by the secondary air pump SLP as a secondary air mass per second.

Figure 2A:
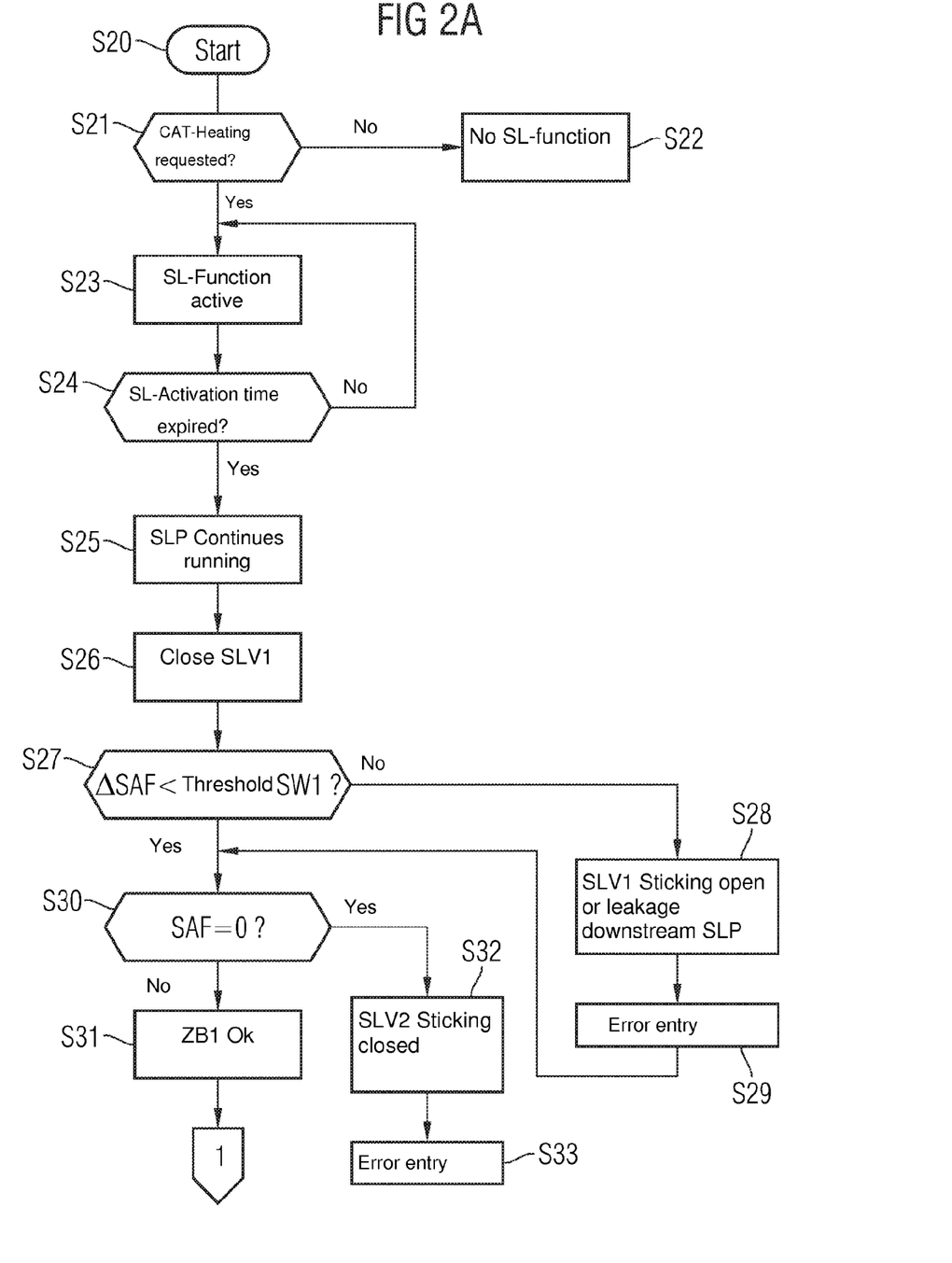
FIGS. 2A and 2B show a program flow sequence for executing the method, and FIG. 3 signal waveforms during the execution of the method.
Figure 2B:
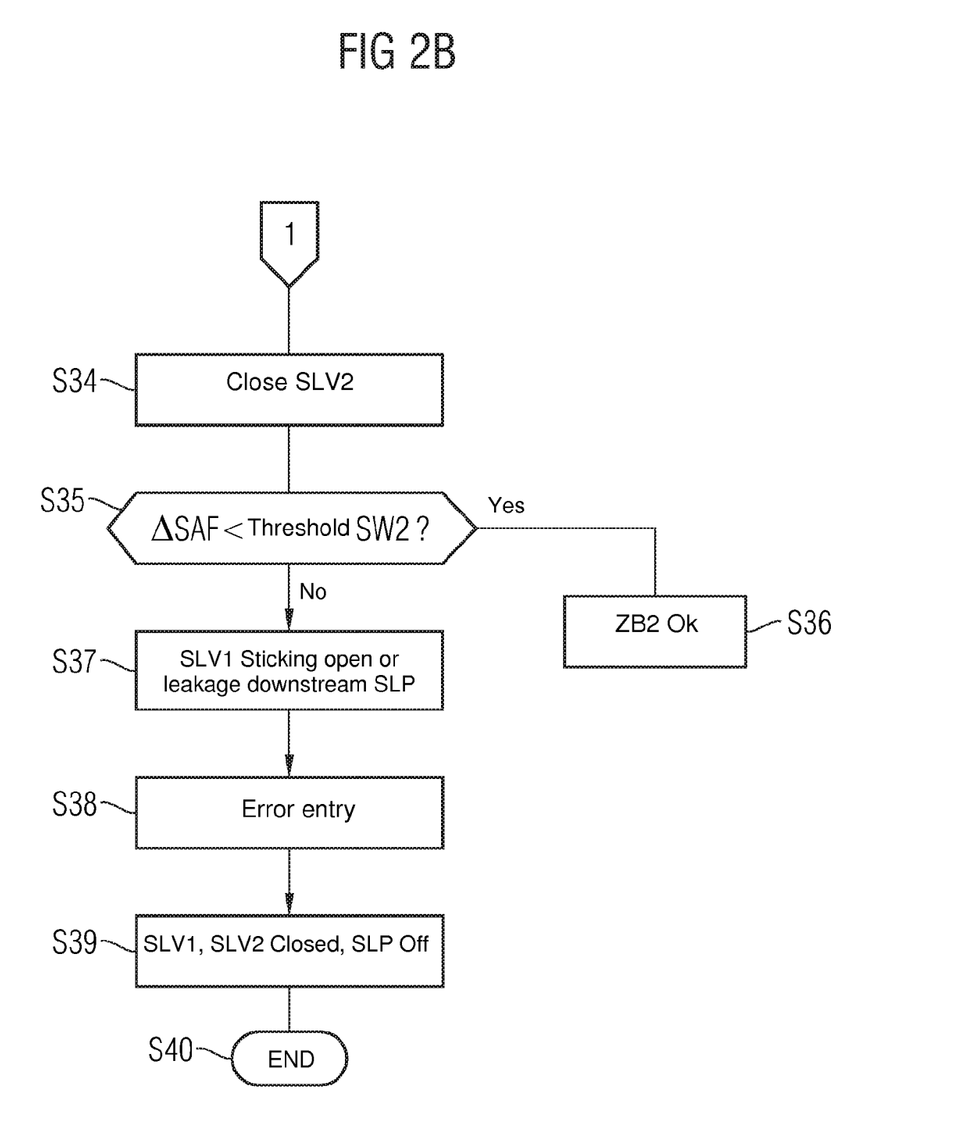

A program which will be explained in more detail below with reference to the flowchart according to FIG. 2A and 2B is stored in the control device 30 for the purpose of monitoring said secondary air system.

A requirement for a diagnosis of this kind is that the secondary air pump SLP actually delivers fresh air, which can be checked by means of a known method, e.g. in accordance with the method described in DE 197 13 180 C1.

The program is started at a step S20, preferably simultaneously with the starting of the internal combustion engine 10. If necessary, parameters can be initialized at step S20.

At step S21 a check is carried out to determine whether it is actually necessary to heat up the catalytic converter 21. If, for example, the internal combustion engine 10 has been switched off only briefly after having been in operation for a comparatively long time, the catalytic converter 21 will still be at a temperature level which renders the activation of additional light-up measures unnecessary and the method branches to step S22; the secondary air function is not activated. Whether it is necessary to heat up the catalytic converter 21 can preferably be interrogated via the temperature of the coolant of the internal combustion engine. The signal of the temperature sensor 33 is evaluated for this purpose. If the temperature of the coolant at the time of starting the internal combustion engine 10 is less than a predefined threshold value, measures to heat up the catalytic converter 21 are initiated. In this case the secondary air function activated at step S23, i.e. the secondary air pump SLP, or, as the case may be, the secondary air charger, is switched on via electrical signals of the control device 30 and the two secondary air valves SLV1, SLV2 are opened. Where appropriate, further measures can be implemented in order to support the secondary air function, such as retarding the ignition timing, multiple injection or post-injection.

At the following step S24 a check is carried out to establish whether a predefined time interval has elapsed since activation of the secondary air function. Said activation time is dependent inter alia on design engineering factors, such as place of installation and size of the catalytic converter 21, and is determined empirically and stored in the data memory 31 of the control device 30. Typical values for the activation time are e.g. 30-40 seconds. While this time interval has not yet expired, the secondary air pump or secondary air charger remains switched on and the two secondary air valves SLV1 and SLV2 remain open, as a result of which the exhaust gas catalytic converter 21 is heated up due to the exothermic reaction that occurs. During this time the values of the secondary air mass SAV are measured continuously, i.e. in a fixed time pattern, by means of the secondary air mass meter 24 and averaged e.g. per segment or filtered with the aid of a known method.

After the activation time has expired, continuous operation of the secondary air pump for the purpose of heating up the catalytic converter is no longer necessary and the pump could be switched off again and the two secondary air valves closed once more. At step S25, however, the secondary air pump is kept operating for the purpose of diagnosing the secondary air system.

At step S26 the secondary air valve SLV1 assigned to the first cylinder bank ZB1 is closed by way of electrical signals of the control device 30 and at the same time the values for the secondary air mass SAF continue to be recorded. At step S27 the difference ASAF between the values for the secondary air mass SAF before and after the closing of the secondary air valve SLV1 is formed and compared with a predefined threshold value SW1. The threshold value SW1 is determined experimentally and stored in the data memory 31 of the control device.

If the secondary air valve SLV1 has closed in the correct manner, then the secondary air mass flow SAF conveyed by the secondary air pump must fall, i.e. ASAF must drop to less than the threshold value SW1. If this is not the case, it is established at step S28 that the secondary air valve SLV1 is sticking in its open position or that a leak is present in the partial secondary air line 26 downstream of the secondary air pump SLP. At step S29 a corresponding fault entry is then written into the error memory 32 and the method branches to step S30.

If the result of the query at step S27 is positive, i.e. the value ASAF is below the threshold value SW1, a branch is taken directly to step S30. At this step S30 it is queried whether the value for the secondary air mass flow SAF is equal to zero. If this is the case, it is concluded at step S32 that the secondary air valve SLV2 is sticking in the closed state and at step S33 a corresponding fault entry is written into the error memory 32.

If the query at step S30 is a negative result, it is established at step S31 that the secondary air system for the cylinder bank ZB1 is okay, i.e. that the secondary air valve SLV1 is closing in the correct manner and that no leak is present in the partial secondary air line 26.

Next, at step S34, an electrical signal is applied to the secondary air valve SLV2 by the control device 30 in order to actuate it into its closed position. At the following step S35 it is queried whether the value ASAF is below a threshold value SW2. This threshold value SW2 is likewise established experimentally, in which case it holds that said value SW2 is greater than the threshold value SW1 in the case of the query at step S27.

If the query at step S35 yields a positive result, it is established at step S36 that the secondary air system for the cylinder bank ZB2 is okay, i.e. that the secondary air valve SLV2 is closing in the correct manner and that no leak is present in the partial secondary air line 27.

If the result of the query at step S35 is negative, i.e. the value ASAF is not below the threshold value SW2, then it is detected at step S37 that a secondary air valve SLV2 is sticking in its open position or that there is a leak in the partial secondary air line 27 downstream of the secondary air pump SLP, and at the following step S38 a corresponding fault entry is written into the error memory 32 of the control device 30. Next, at step S39, electrical signals for closing the two secondary air valves SLV1 and SLV2 are output by the control device 30, the secondary air pump SLP is switched off and the method brought to an end at step S40.

Figure 3:
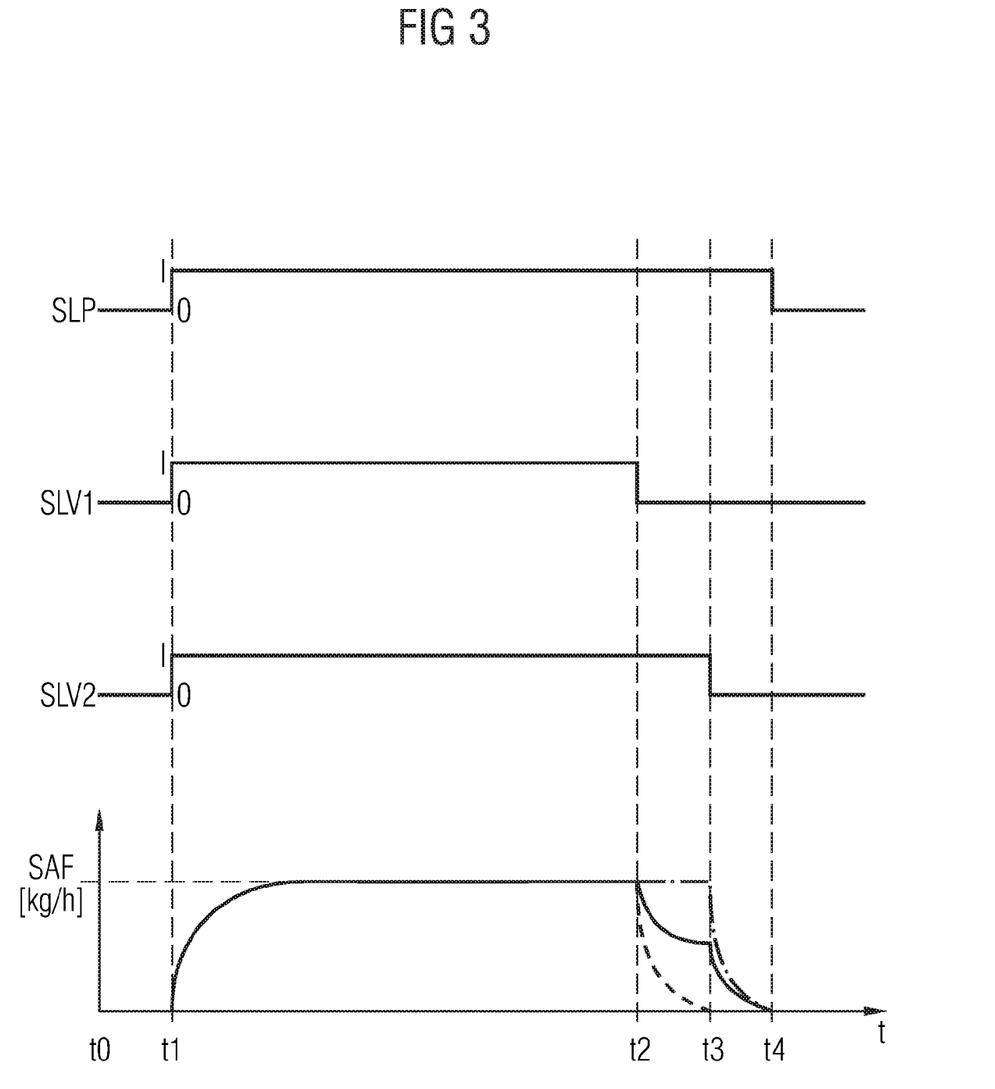

FIG. 3 shows selected waveforms of signals during the execution of the method as a function of time t, specifically the control signal for the secondary air pump SLP, the control signal for the secondary air valve SLV1, the control signal for the secondary air valve SLV2, and the measured signal SAV of the secondary air mass meter 24.

The internal combustion engine 10 is started at time t0. At this time the secondary air pump SLP has not yet been switched on and consequently the control signal for the secondary air pump SLP shown in FIG. 3 has the value 0. Similarly, the two secondary air valves SLV1 and SLV2 are still closed. The secondary air pump SLP is switched on by the control device 30 at time t1 and simultaneously the two secondary air valves SLV1 and SLV2 are opened. After the secondary air pump is switched on, the signal SAF of the secondary air mass meter 24 initially rises and then remains at a stationary value. At time t2, at which the time period for the heating-up of the catalytic converter has been reached, the secondary air valve SLV1 is closed, as already described with reference to the flowchart according to FIG. 2A (steps S24 and S25), and at time t3 the secondary air valve SLV2 is in the closed state, while the secondary air pump SLP is not switched off until time t4. If both secondary air valves are operating correctly and there is no leak in the two partial secondary air lines 26, 27 downstream of the secondary air pump SLP, a shape of the measured signal SAF of the air mass meter 24 as shown by the unbroken line is produced.

The shape shown by the dashed line in FIG. 3 is produced if the secondary air valve SLV2 sticks in the closed position, and the shape shown by the dash-dotted line is produced if the secondary air valve SLV1 sticks in the closed position.

In order to achieve an even faster light-up of the exhaust gas catalytic converter by means of secondary air, it is possible to activate the secondary air system not just at time t1, but simultaneously with the starting of the internal combustion engine.

The invention claimed is:

1. A device for monitoring the secondary air system of a multi-cylinder internal combustion engine by means of which secondary air is introduced into the exhaust gas of the internal combustion engine, wherein
the internal combustion engine has at least two cylinder banks, to each of which a specific number of cylinders of the internal combustion engine are assigned and each individual cylinder bank has a separate exhaust gas duct,
a compressing means is provided that conveys secondary air and introduces the secondary air into the respective exhaust gas ducts by way of a number of individual secondary air lines corresponding to the number of exhaust gas ducts, and comprising:
in each case a flow control means controllable independently of each other by means of signals of a control device in each of the individual secondary air lines for the purpose of introducing secondary air mass flows on an individual cylinder bank basis,
an air mass meter from the signal of which a value is determined for the total secondary air mass flow that is introduced into the exhaust gas ducts,
wherein the control device is operable
to actuate the flow control means into an open position,
to record the value for the total secondary air mass flow,
to then actuate the flow control means into a closed position individually at time intervals relative to one another,
to record the values for the secondary air mass flows occurring thereby before and after the closing of the individual flow control means,
to compare said values with a plurality of different threshold values, and
to differentiate the fault location with regard to the respective cylinder bank as a function of the result of the comparison.

2. The device according to claim 1, wherein
at a first step a first of the flow control means is closed,
the difference between the values for the secondary air mass flow before and after the closing of the first flow control means is formed and compared with a first threshold value,
if the first threshold value is exceeded, it is concluded that a flow control means in the secondary air line of the first cylinder bank is sticking in the open state or that there is a leak in the secondary air line of the first cylinder bank,
a check is carried out to determine whether the value of the secondary air mass flow is equal to zero and in the case of a positive result it is concluded that a flow control means in the secondary air line of the further cylinder bank is sticking in the closed state,
otherwise the secondary air system of the first cylinder bank is classified as operating correctly.

3. The device according to claim 1, wherein the control device is further operable
to close of a further flow control means,
to form of the difference between the values for the secondary air mass flow before and after the closing of the further flow control means and comparison with a second threshold value,
if the second threshold value is exceeded, to determine that a flow control means in the secondary air line of the second cylinder bank is sticking in the open state or that there is a leak in the secondary air line of the second cylinder bank,
to otherwise classify the secondary air system of the second cylinder bank as operating correctly.

4. The device according to claim 1, wherein if malfunctions of the secondary air system are detected a corresponding entry is written into an error memory of the control device and/or the occurrence of the malfunction is communicated to the driver of the vehicle being driven by means of the internal combustion engine.

5. The device according to claim 1, comprising an electrically driven secondary air pump as the compressing means.

6. The device according to claim 1, comprising a secondary air charger as the compressing means, a turbine of said secondary air charger being driven by the pressure difference at a throttle valve in the intake duct of the internal combustion engine and a compressor being disposed in a secondary air bypass to the throttle valve.

7. The device according to claim 1, comprising electrically controllable secondary air valves as flow control means.

8. The device according to claim 1, comprising electrical-pneumatic secondary air valves as flow control means.

9. The device according to claim 1, wherein the threshold values are determined and specified experimentally, the second threshold value SW2 being greater than the first threshold value SW1.

10. A method for monitoring the secondary air system of a multi-cylinder internal combustion engine by means of which secondary air is introduced into the exhaust gas of the internal combustion engine, the method comprising the steps of:
  subdividing the individual cylinders of the internal combustion engine into at least two cylinder banks and assigning each cylinder bank a separate exhaust gas duct,
  conveying secondary air with the aid of a compressing means and introducing the secondary air into the respective exhaust gas ducts by way of a number of individual secondary air lines corresponding to the number of exhaust gas ducts,
  adjusting the flow rate of the secondary air mass flow with the aid of electrically controllable flow control means in each of the individual secondary air lines independently of each other for the purpose of introducing secondary air mass flows on an individual cylinder bank basis,
  determining a value for the total secondary air mass flow that is introduced into the exhaust gas ducts from the signal of a secondary air mass meter,
  actuating the flow control means into an open position,
  recording the value for the total secondary air mass flow,
  actuating the flow control means into a closed position individually at time intervals relative to one another,
  recording the values for the secondary air mass flows occurring thereby before and after the closing of the individual flow control means,
  comparing said values with a plurality of different threshold values, and
  making a differentiation of the fault location with regard to the respective cylinder bank as a function of the result of the comparisons.

11. The method according to claim 10, wherein
  at a first step a first of the flow control means is closed,
  the difference between the values for the secondary air mass flow before and after the closing of the first flow control means is formed and compared with a first threshold value,
  if the first threshold value is exceeded, it is concluded that a flow control means in the secondary air line of the first cylinder bank is sticking in the open state or that there is a leak in the secondary air line of the first cylinder bank,
  a check is carried out to determine whether the value of the secondary air mass flow is equal to zero and in the case of a positive result it is concluded that a flow control means in the secondary air line of the further cylinder bank is sticking in the closed state,
  otherwise the secondary air system of the first cylinder bank is classified as operating correctly.

12. The method according to claim 10, further comprising the steps:
  closing of a further flow control means,
  forming of the difference between the values for the secondary air mass flow before and after the closing of the further flow control means and comparison with a second threshold value,
  if the second threshold value is exceeded, it is determined that a flow control means in the secondary air line of the second cylinder bank is sticking in the open state or that there is a leak in the secondary air line of the second cylinder bank,
  otherwise the secondary air system of the second cylinder bank is classified as operating correctly.

13. The method according to claim 10, wherein if malfunctions of the secondary air system are detected a corresponding entry is written into an error memory of the control device and/or the occurrence of the malfunction is communicated to the driver of the vehicle being driven by means of the internal combustion engine.

14. The method according to claim 10, wherein an electrically driven secondary air pump is used as the compressing means.

15. The method according to claim 10, wherein a secondary air charger is used as the compressing means, a turbine of said secondary air charger being driven by the pressure difference at a throttle valve in the intake duct of the internal combustion engine and a compressor being disposed in a secondary air bypass to the throttle valve.

16. The method according to claim 10, wherein electrically controllable secondary air valves are used as flow control means.

17. The method according to claim 10, wherein electrical-pneumatic secondary air valves are used as flow control means.

18. The method according to claim 10, wherein the threshold values are determined and specified experimentally, the second threshold value SW2 being greater than the first threshold value SW1.

* * * * *